United States Patent [19]
Turner et al.

[11] Patent Number: 5,791,081
[45] Date of Patent: Aug. 11, 1998

[54] DEER DECOY

[76] Inventors: Michael L. Turner; Christopher L. Turner. both of P.O. Box 219, Parker, S. Dak. 57053

[21] Appl. No.: 888,257

[22] Filed: Jul. 3, 1997

[51] Int. Cl.⁶ .................................................. A01M 31/06
[52] U.S. Cl. .................................................................. 43/2
[58] Field of Search ................................ 43/1, 2; 446/330

[56] References Cited

U.S. PATENT DOCUMENTS

| | | | |
|---|---|---|---|
| D. 356,620 | 3/1995 | Weber et al. | D22/125 |
| 4,322,908 | 4/1982 | McCrory | 43/3 |
| 4,773,178 | 9/1988 | Marek | 43/2 |
| 4,852,288 | 8/1989 | Payne et al. | 43/2 |
| 4,965,953 | 10/1990 | McKinney | 43/2 |
| 5,231,780 | 8/1993 | Gazalski | 43/3 |
| 5,233,780 | 8/1993 | Overholt | 43/2 |
| 5,274,942 | 1/1994 | Lanius | 43/2 |
| 5,289,654 | 3/1994 | Denny et al. | 43/2 |
| 5,377,439 | 1/1995 | Roos et al. | 43/3 |
| 5,546,692 | 8/1996 | Byers | 43/2 |
| 5,632,110 | 5/1997 | Roy | 43/2 |

*Primary Examiner*—Robert P. Swiatek

[57] ABSTRACT

A new deer decoy for attracting an animal such as a deer into close proximity of a waiting hunter. The inventive device includes a deer shaped main body member including a head portion and a rear portion. A pair of ear members are rotatably mounted to the head portion and are rotatable between a friendly position and a challenging position. A tail member is pivotally mounted to the rear portion and is pivotable between a first position and a second position to simulate the tail movement of a live animal.

17 Claims, 3 Drawing Sheets

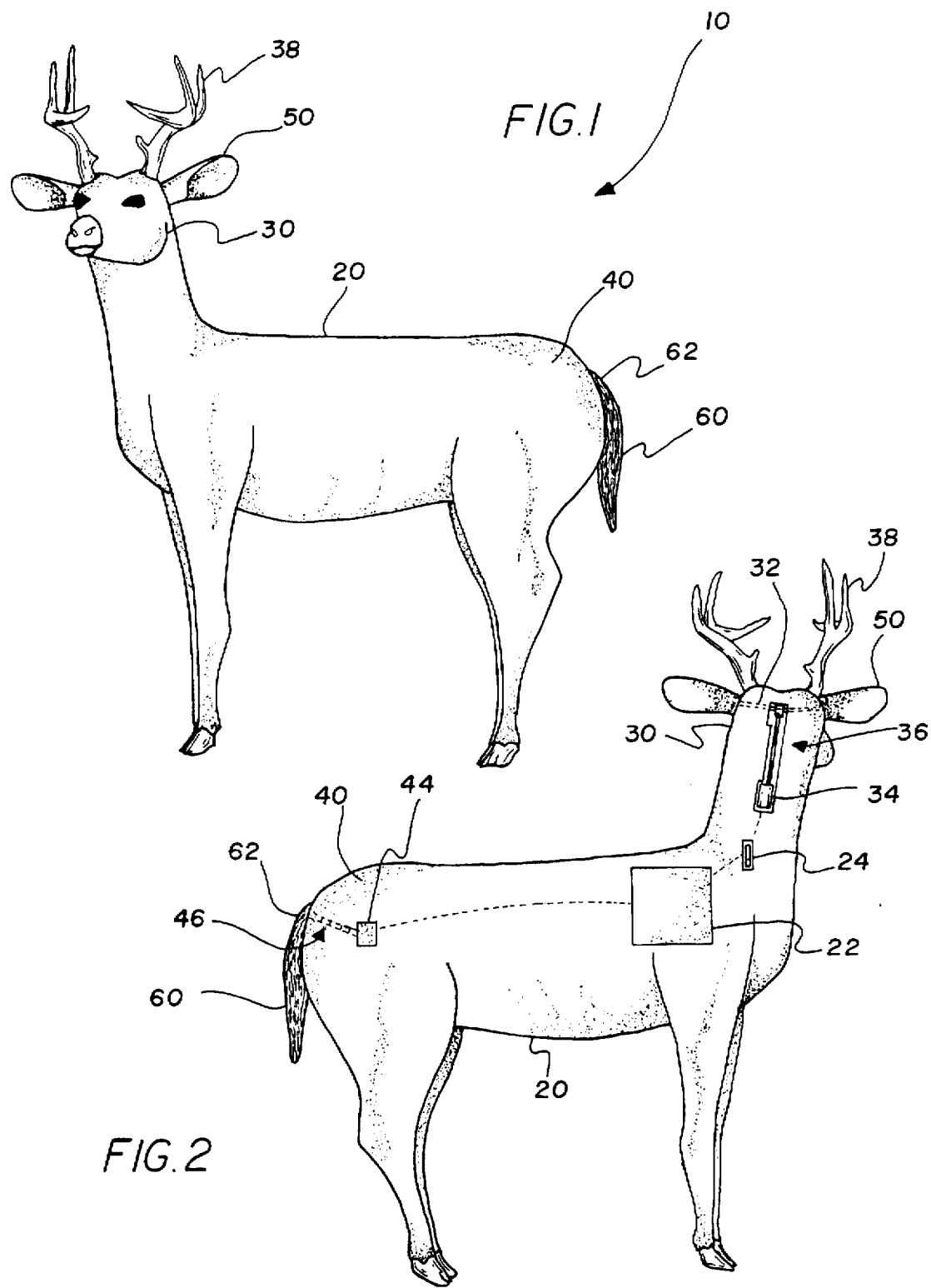

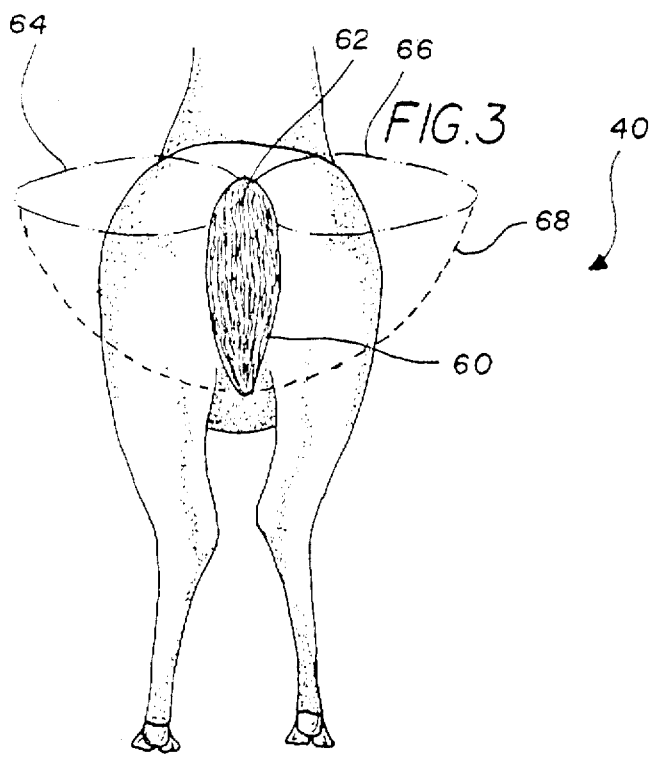
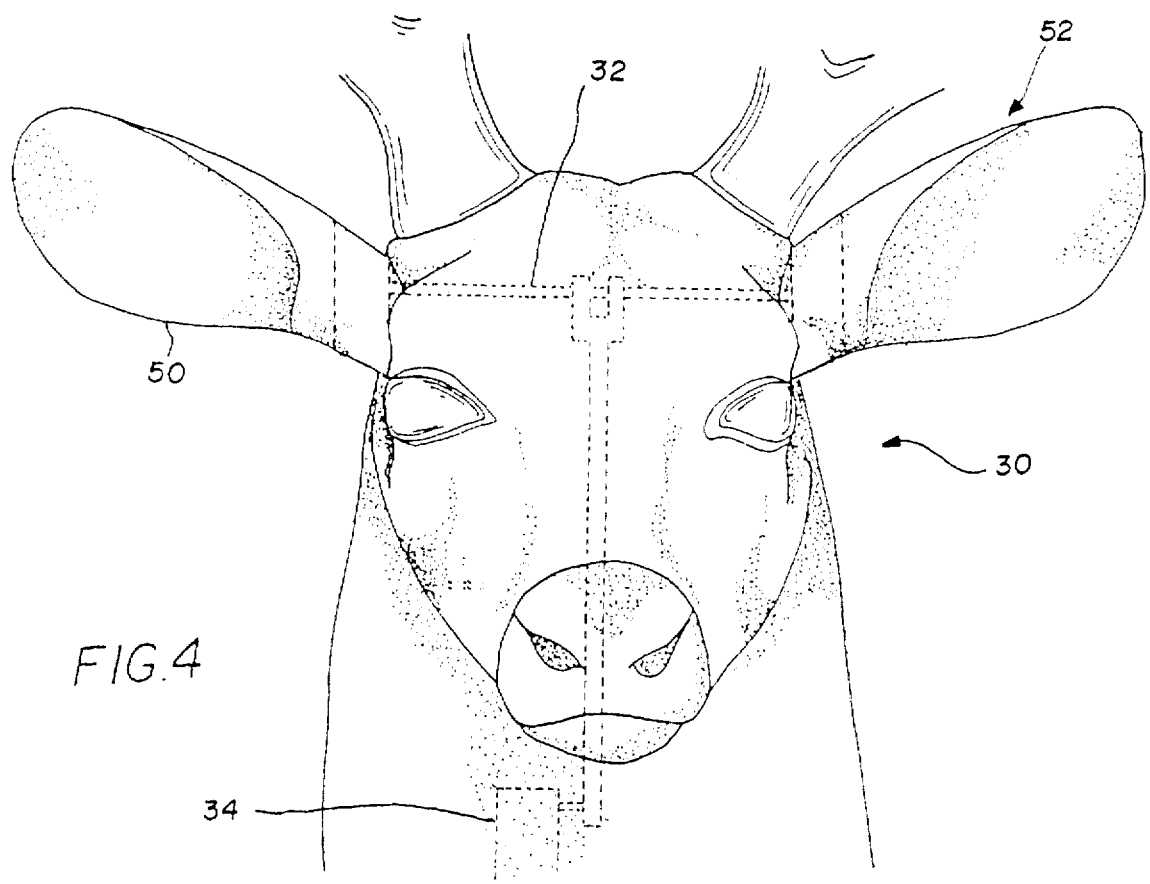

DEER DECOY

BACKGROUND OF THE INVENTION

1. Field of the Invention

The present invention relates to wild game decoys and more particularly pertains to a new deer decoy for attracting an animal such as a deer into close proximity of a waiting hunter.

2. Description of the Prior Art

The use of wild game decoys is known in the prior art. More specifically, wild game decoys heretofore devised and utilized are known to consist basically of familiar, expected and obvious structural configurations, notwithstanding the myriad of designs encompassed by the crowded prior art which have been developed for the fulfillment of countless objectives and requirements.

Known prior art wild game decoys include U.S. Pat. No. 4,322,908; U.S. Pat. No. 4,773,178; U.S. Pat. No. 4,852,288; U.S. Pat. No. 4,965,953; U.S. Pat. No. 5,233,780; U.S. Pat. No. 5,231,780; U.S. Pat. No. 5,274,942; U.S. Pat. No. 5,289,654; U.S. Pat. No. 5,377,439; and U.S. Pat. No. Des. 356,620.

Wild game decoys having no moving parts are widely used by hunters, but are somewhat unsatisfactory because they are rigid and do not give the appearance of movement.

Successful bowhunting requires that a deer be within at least 50 yards from the average bowhunter. Conventional stationary decoys and many animated decoys only attract deer to within about 100 yards, far out of the range of accuracy of a bowhunter.

While these devices fulfill their respective, particular objectives and requirements, the aforementioned patents do not disclose a new deer decoy. The inventive device includes a deer shaped main body member including a head portion and a rear portion. A pair of ear members are rotatably mounted to the head portion and are rotatable between a friendly position and a challenging position. A tail member is pivotally mounted to the rear portion and is pivotable between a first position and a second position to help simulate the tail movement of a live animal.

In these respects, the deer decoy according to the present invention substantially departs from the conventional concepts and designs of the prior art, and in so doing provides an apparatus primarily developed for the purpose of attracting an animal such as a deer into close proximity of a waiting hunter.

SUMMARY OF THE INVENTION

In view of the foregoing disadvantages inherent in the known types of wild game decoys now present in the prior art, the present invention provides a new deer decoy construction wherein the same can be utilized for attracting an animal such as a deer into close proximity of a waiting hunter.

The general purpose of the present invention, which will be described subsequently in greater detail, is to provide a new deer decoy apparatus and method which has many of the advantages of the wild game decoys mentioned heretofore and many novel features that result in a new deer decoy which is not anticipated, rendered obvious, suggested, or even implied by any of the prior art wild game decoys, either alone or in any combination thereof.

To attain this, the present invention generally comprises a deer shaped main body member including a head portion and a rear portion. A pair of ear members are rotatably mounted to the head portion and are rotatable between a friendly position and a challenging position. A tail member is pivotally mounted to the rear portion and is pivotable between a first position and a second position to help simulate the tail movement of a live animal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new deer decoy apparatus and method which has many of the advantages of the wild game decoys mentioned heretofore and many novel features that result in a new deer decoy which is not anticipated, rendered obvious, suggested, or even implied by any of the prior art wild game decoys, either alone or in any combination thereof.

It is another object of the present invention to provide a new deer decoy which may be easily and efficiently manufactured and marketed.

It is a further object of the present invention to provide a new deer decoy which is of a durable and reliable construction.

An even further object of the present invention is to provide a new deer decoy which is susceptible of a low cost of manufacture with regard to both materials and labor, and which accordingly is then susceptible of low prices of sale to the consuming public, thereby making such deer decoy economically available to the buying public.

Still yet another object of the present invention is to provide a new deer decoy which provides in the apparatuses and methods of the prior art some of the advantages thereof, while simultaneously overcoming some of the disadvantages normally associated therewith.

Still another object of the present invention is to provide a new deer decoy for attracting an animal such as a deer into close proximity of a waiting hunter.

Yet another object of the present invention is to provide a new deer decoy which includes a deer shaped main body member including a head portion and a rear portion. A pair of ear members are rotatably mounted to the head portion and are rotatable between a friendly position and a challenging position. A tail member is pivotally mounted to the rear portion and is pivotable between a first position and a second position to help simulate the tail movement of a live animal.

Still yet another object of the present invention is to provide a new deer decoy that provides movement that appropriately simulates certain deer movements to attract deer towards the decoy.

Even still another object of the present invention is to provide a new deer decoy that helps attracts male deer to within the range of a bow hunter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new deer decoy according to the present invention.

FIG. 2 is an opposite side view of the present invention.

FIG. 3 is a rear view of the present invention illustrating the pivoting of the tail member between a first position and a second position.

FIG. 4 is a front view of the head portion of the main body member of the present invention with the ear members in the friendly position.

DESCRIPTION OF THE PREFERRED EMBODIMENT

Figure 5:
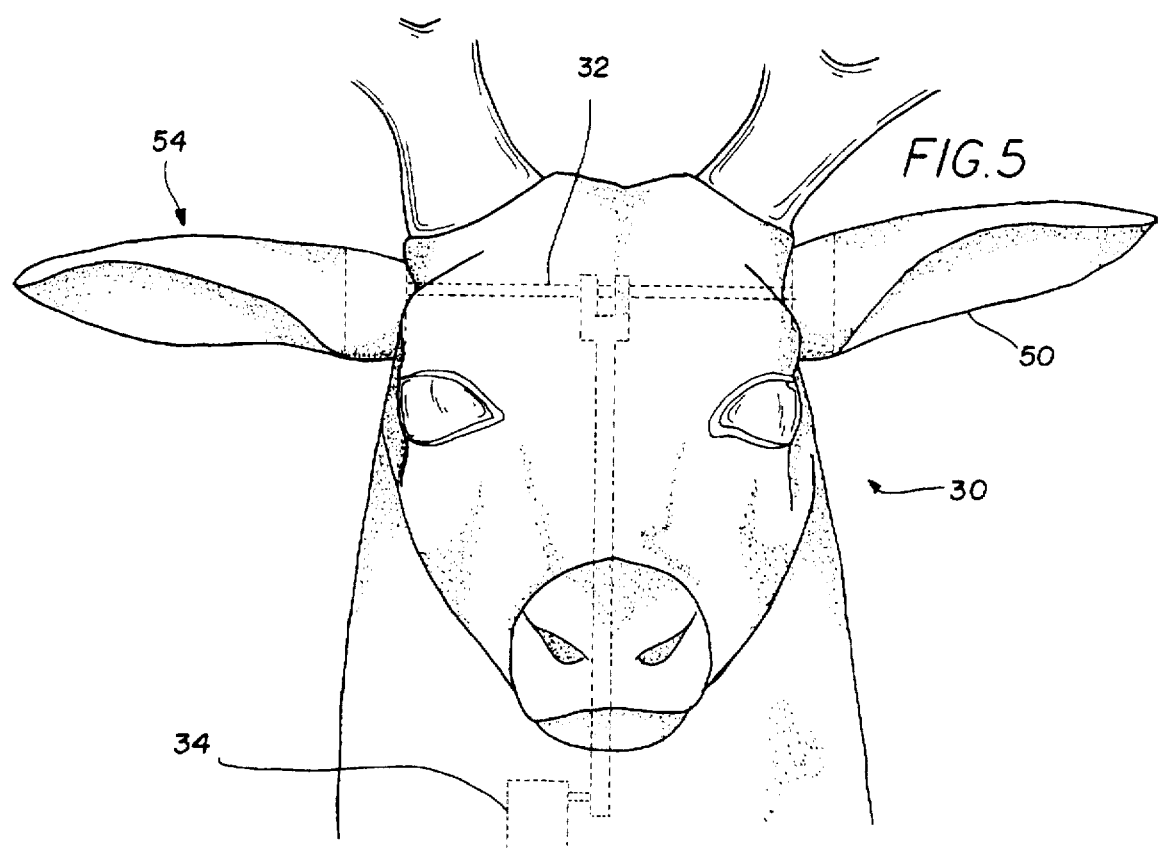
FIG. 5 is a front view of the head portion of the main body member of the present invention with the ear members in the challenging position.
Figure 6:
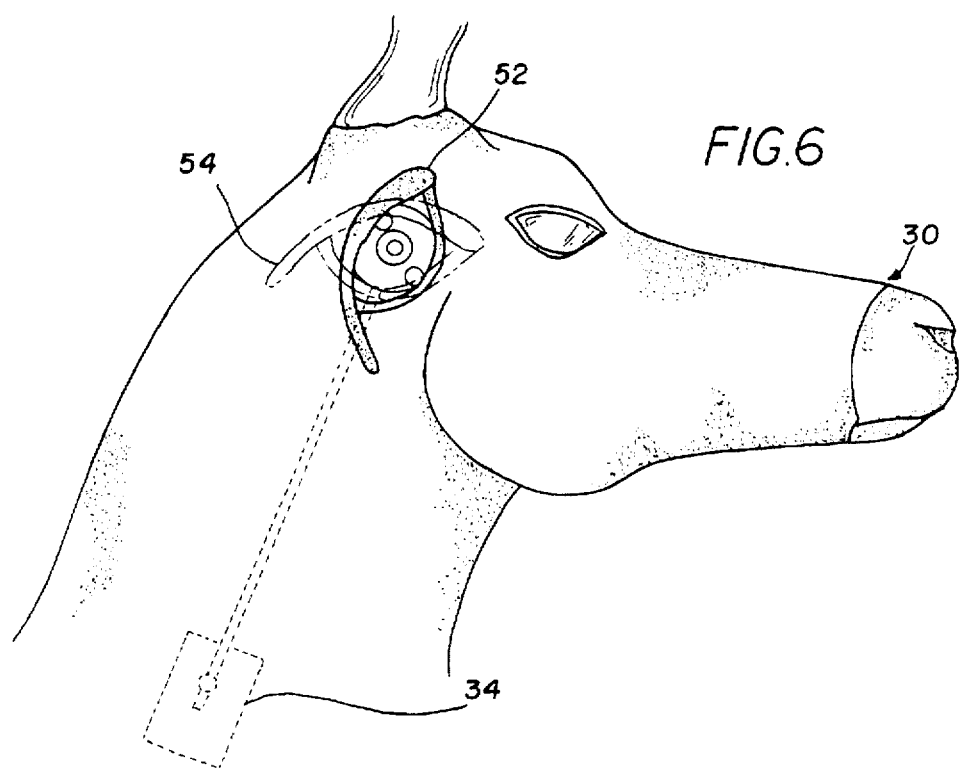
FIG. 6 is a side view of the head portion of the main body member of the present invention illustrating the relationship between the friendly position and the challenging position of the ear members.

With reference now to the drawings, and in particular to FIGS. 1 through 6 thereof, a new deer decoy embodying the principles and concepts of the present invention and generally designated by the reference numeral 10 will be described.

As best illustrated in FIGS. 1 through 6, the deer decoy 10 comprises a main body member 20 that includes a head portion 30 and a rear portion 40. A pair of ear members 50 are rotatably mounted to the head portion 30. A tail member 60 is pivotally mounted to the rear portion 40.

Preferably, the main body member 20 is shaped to resemble an ungulate animal or hoofed mammal. Even more preferably, the main body member 20 is shaped to resemble an ungulate of the Cervidae family such as a deer, elk, caribou, reindeer, or moose. Ideally, the main body member 20 is shaped and ornamented to resemble a male deer. In such an embodiment, it is preferable that antlers 38 are extended from the head portion 30.

The ear members 50 are rotatably mounted to the head portion 30 and are rotatable between a friendly position 52, and a challenging position 54. As illustrated in FIG. 4, the friendly position 52 helps in representing a content or safe appearance by the deer decoy 10. As illustrated by FIG. 5, the challenging position 54 helps in representing a challenging appearance that the deer decoy 10 is challenging an animal such as a deer.

Preferably, the ear members 50 are mounted on opposite ends of an elongate axle 32 that extends through the head portion 30. The axle is rotatable in relation to the head portion 30 to allow rotation of the ear members 50 between the friendly position 52 and the challenging position 54.

Preferably, a first rotating means 36 selectively rotates the ear members 50. Ideally, the first rotating means 36 includes a first servo mechanism 34 and a first control means (not shown). The first control means selectively controls the operation of the first servo mechanism 34, which is operatively coupled to the axle 32 to permit rotation of the ear members 50 between the friendly position 52 and the challenging position 54.

With reference to FIG. 3, the tail member base end 62 is pivotally coupled to the rear portion 40 of the main body member 20 of the deer decoy 10 to permit pivoting of the tail member 60 between a first position 64 and a second position 66. The angle between the first position 64 and second position 66 defines a swing angle 68. Preferably, the swing angle 68 is less than about 180 degrees. Ideally, the swing angle 68 is less than about 90 degrees. Even more ideally, the tail member 60 pivots about 45 degrees on each side of a vertical axis passing through the tail member base end 62.

Preferably, a pivoting means 46 selectively pivots the tail member 60. Ideally, the pivoting means 46 includes a second servo mechanism 44 and a second control means (not shown). The second control means selectively controls the operation of the second servo mechanism 44, which is operatively coupled to the tail member base end 62 to permit pivoting of the tail member 60 between the first position 64 and the second position 66.

Ideally, the first control means and second control means each include a transmitting means (not shown) and a receiving means (not shown) for receiving a signal sent from the transmitting means. The receiving means are operatively coupled to the first and second servo mechanisms 34, 44, respectively.

Ideally, the first and second control means each include an actuator lever operatively coupled to the transmitting means for selectively controlling each transmitting means. The control means may include, for example, a hand held transmitting means such as a remote control unit emitting radio signals to the receiving means. As another example, the control means may include a transmitting means operatively coupled to the receiving means by a wire extending between the transmitting means and the receiving means.

Also ideally, the first and second control means include a power source 22 such as a battery to provide power to the first and second servo mechanisms 34, 44. The power source may also include a power switch 24 to selectively provide power to the first and second servo mechanisms 34, 44.

Ideally, the first and second servo mechanisms 34, 44 are provided within the main body member interior, as shown in FIG. 2. The power source 22 may also be provided within the main body member interior.

As an illustration of the deer decoy 10 in use, the ear members 50 are first rotated towards the friendly position 52 to help attract deer by signaling that the deer is friendly. The tail member 60 may also be activated to pivot or wag between the first position 64 and the second position 66. The ear members 50 may also be twitched from the friendly position 52 towards the challenging position 54. The movement of the tail member 60 and the ear members 50 help make the deer decoy 10 appear lifelike to help attract deer towards the decoy 10. As a deer approaches to investigate the deer decoy 10, the wagging of the tail member 60 and twitching of the ear members 50 may be halted. To help bring the deer in closer, the ear members 50 may be rotated into the challenging position 54 to help provoke a male deer into charging the decoy 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A wild game decoy, comprising:
   a main body member having a head portion and a rear portion;
   a pair of ear members being rotatably mounted to said head portion, each said ear member being rotatable between a friendly position and a challenging position;
   a tail member having a base end, said base end being pivotally mounted to said main body member rear portion, said tail member being pivotable between a first position and a second position; and
   wherein a swing angle is defined between said first position and said second position, said swing angle being less than about 180 degrees.

2. The wild game decoy of claim 1, wherein said swing angle is less than about 90 degrees.

3. The wild game decoy of claim 1, further comprising a first rotating means for selectively rotating each said ear member between said friendly position and said challenging position.

4. The wild game decoy of claim 1, further comprising a pivoting means for selectively pivoting said tail member.

5. The wild game decoy of claim 1, wherein said main body member is shaped to resemble an Ungulate animal.

6. The wild game decoy of claim 5, wherein said main body member is shaped to resemble a Cervidae animal.

7. The wild game decoy of claim 6, wherein said main body member is shaped to resemble a male deer.

8. A wild game decoy, comprising:
   a main body member having a head portion and a rear portion;
   a pair of ear members being rotatably mounted to said head portion, each said ear member being rotatable between a friendly position and a challenging position;
   a tail member having a base end, said base end being pivotally mounted to said main body member rear portion, said tail member being pivotable between a first position and a second position;
   wherein a swing angle is defined between said first position and said second position, said swing angle being less than about 180 degrees;
   a first rotating means for selectively rotating each said ear member between said friendly position and said challenging position; and
   a pivoting means for selectively pivoting said tail member.

9. The wild game decoy of claim 8, wherein said swing angle is less than about 90 degrees.

10. The wild game decoy of claim 8, wherein said main body member is shaped to resemble a deer.

11. A wild game decoy, comprising:
    a main body member having a head portion and a rear portion;
    an elongate axle having a pair of opposing ends, said axle being extended through said head portion, said axle being rotatable in relation to said head portion;
    an ear member being mounted to each said end of said axle, each said ear member being rotatable with said axle between a friendly position and a challenging position;
    a first rotating means for selectively rotating each said ear member between said friendly position and said challenging position, said first rotating means including:
        a first servo mechanism being operatively coupled to said axle, said first servo mechanism permitting rotation of each said ear member between said friendly position and said challenging position; and
        a first control means for selectively controlling the operation of said first servo mechanism;
    a tail member having a base end, said base end being pivotally mounted to main body member rear portion, said tail member being pivotable between a first position and a second position;
    a pivoting means for selectively pivoting said tail member, said pivoting means including:
        a second servo mechanism being operatively coupled to said tail member base end, said second servo mechanism permitting pivoting of said tail member between said first position and said second position; and
        a second control means for selectively controlling the operation of said second servo mechanism; and
    wherein a swing angle is defined between said first position and said second position, said swing angle being less than about 180 degrees.

12. The wild game decoy of claim 11, wherein said main body member has an interior, said first servo mechanism being provided within said main body member, and said second servo mechanism being provided within said main body member.

13. The wild game decoy of claim 11, wherein said first control means includes a first transmitting means and a first receiving means, said first transmitting means being for transmitting a signal to said first receiving means, said first receiving means being for receiving a signal from said first transmitting means, said first receiving means being operatively coupled to said first servo mechanism.

14. The wild game decoy of claim 13, wherein said first control means includes a first actuator lever being operatively coupled to said first transmitting means, said first actuator lever being for selectively controlling said first transmitting means.

15. The wild game decoy of claim 11, wherein said second control means includes a second transmitting means and a second receiving means, said second transmitting means being for transmitting a signal to said second receiving means, said second receiving means being for receiving a signal from said second transmitting means, said second receiving means being operatively coupled to said second servo mechanism.

16. The wild game decoy of claim 15, wherein said second control means includes a second actuator lever being operatively coupled to said second transmitting means, said second actuator lever being for selectively controlling said second transmitting means.

17. A method for attracting a dear towards a deer decoy, comprising the steps of:

providing a deer decoy, comprising:

a main body member having a head portion and a rear portion;

a pair of ear members being rotatably mounted to said head portion, each said ear member being rotatable between a friendly position and a challenging position;

a tail member having a base end, said base end being pivotally mounted to said main body member rear portion, said tail member being pivotable between a first position and a second position;

wherein a swing angle is defined between said first position and said second position, said swing angle being less than about 180 degrees;

a first rotating means for selectively rotating each said ear member between said friendly position and said challenging position; and a pivoting means for selectively pivoting said tail member;

rotating said ear members towards said friendly position, said friendly position being for attracting animals towards said deer decoy;

pivoting said tail member between said first position and said second position, said tail member being pivoted to attract an animal towards said deer decoy;

halting the pivoting of said tail member once an animal approaches a distance from said deer decoy; and rotating said ear member from said friendly position towards said challenging position, said challenging position being for encouraging an animal to charge said deer decoy.

\* \* \* \* \*